US009102398B2

(12) United States Patent
Vaghela

(10) Patent No.: US 9,102,398 B2
(45) Date of Patent: Aug. 11, 2015

(54) DEPLOYMENT SYSTEM

(71) Applicant: AIRBUS OPERATIONS LIMITED, Bristol (GB)

(72) Inventor: Naresh Vaghela, Bristol (GB)

(73) Assignee: Airbus Operations Limited, Bristol (GB)

(*) Notice: Subject to any disclaimer, the term of this patent is extended or adjusted under 35 U.S.C. 154(b) by 152 days.

(21) Appl. No.: 13/684,340

(22) Filed: Nov. 23, 2012

(65) Prior Publication Data

US 2013/0126670 A1 May 23, 2013

(30) Foreign Application Priority Data

Nov. 23, 2011 (GB) .................................. 1120234.8

(51) Int. Cl.
*B64C 9/00* (2006.01)
*B64C 13/00* (2006.01)
*B64C 5/10* (2006.01)
*B64C 13/28* (2006.01)
*B64C 9/22* (2006.01)
*B64D 45/00* (2006.01)

(52) U.S. Cl.
CPC . *B64C 13/28* (2013.01); *B64C 9/22* (2013.01); *B64D 2045/001* (2013.01)

(58) Field of Classification Search
CPC .......... B64C 13/28; B64C 9/22; B64C 13/16; B64D 2045/001
USPC ................................ 244/99.2–99.4, 214, 203
See application file for complete search history.

(56) References Cited

U.S. PATENT DOCUMENTS

| 4,521,060 | A | | 6/1985 | Linton | |
|---|---|---|---|---|---|
| 5,222,653 | A | * | 6/1993 | Joyce et al. | 228/173.6 |
| 5,628,477 | A | * | 5/1997 | Caferro et al. | 244/214 |
| 5,680,124 | A | * | 10/1997 | Bedell et al. | 340/945 |
| 5,686,907 | A | * | 11/1997 | Bedell et al. | 340/945 |
| 6,299,108 | B1 | * | 10/2001 | Lindstrom et al. | 244/213 |
| 6,382,566 | B1 | * | 5/2002 | Ferrel et al. | 244/215 |
| 6,386,482 | B1 | * | 5/2002 | Capewell | 244/129.1 |
| 6,466,141 | B1 | * | 10/2002 | McKay et al. | 340/963 |
| 8,115,649 | B2 | * | 2/2012 | Moy et al. | 340/686.1 |
| 8,152,110 | B2 | * | 4/2012 | Schlegel et al. | 244/233 |
| 8,474,762 | B2 | * | 7/2013 | Peirce | 244/213 |
| 8,646,346 | B2 | * | 2/2014 | Hubberstey et al. | 73/865.9 |
| 2005/0029407 | A1 | | 2/2005 | Pohl et al. | |
| 2008/0265090 | A1 | * | 10/2008 | Schievelbusch | 244/99.3 |
| 2009/0212977 | A1 | | 8/2009 | Pohl | |
| 2010/0038493 | A1 | | 2/2010 | Lang et al. | |
| 2010/0277346 | A1 | * | 11/2010 | Moy et al. | 340/945 |
| 2011/0062282 | A1 | | 3/2011 | Richter et al. | |
| 2011/0290044 | A1 | * | 12/2011 | Hubberstey et al. | 73/865.9 |
| 2011/0290946 | A1 | * | 12/2011 | Peirce | 244/213 |
| 2012/0312932 | A1 | * | 12/2012 | Hue et al. | 244/214 |

FOREIGN PATENT DOCUMENTS

WO   WO 2011/057817    5/2011
WO   WO 2011/110833    9/2011

OTHER PUBLICATIONS

Search Report for GB 1120234.8 dated Mar. 13, 2012.

* cited by examiner

*Primary Examiner* — Philip J Bonzell
(74) *Attorney, Agent, or Firm* — Nixon & Vanderhye P.C.

(57) ABSTRACT

A deployment mechanism is disclosed for deploying a deployable member supported on tracks relative to a base member and comprising a brake system operable in response to relative skewing of the tracks.

17 Claims, 6 Drawing Sheets

DEPLOYMENT SYSTEM

This application claims priority to GB 1120234.8 filed 23 Nov. 2011, the entire contents of each of which are hereby incorporated by reference.

FIELD OF INVENTION

The present invention relates to deployment system for aircraft control surfaces.

BACKGROUND OF THE INVENTION

Aircraft wings commonly comprise deployable control surfaces such as slats, droop noses, airbrakes or ailerons. Slats, for example, are commonly supported on the wing fixed leading edge by two tracks driven by actuators arranged to achieve the correct slat to position for take off and landing of the aircraft. Failure in one of the actuators can lead to a jam of the slat deployment mechanism due to the high back driving torque in the actuator. Such failure can lead to differential track movement causing high tensional stresses in the slat body and high stresses in the slat attachment and the fixed leading edge. Such high stress levels increase the possibility of slat detachment from the aircraft wing.

SUMMARY OF THE INVENTION

An embodiment of the invention provides a deployment system for deploying a deployable member relative to a base member, the deployment mechanism comprising:
a base member;
a deployable member for deployment relative to the base member;
a plurality of tracks fixed to the deployable member, supported by the base member and operable for parallel simultaneous movement relative to the base member;
actuator means operable to drive the tracks so as to deploy the deployable member;
sensor means operable to detect relative skew of the tracks; and
brake means operable in response to detection of the relative skew by the sensor means to brake the track so as to substantially prevent further skewing of the tracks.

The deployment system further comprising limiter means associated with the actuator means, the limiter means being arranged to limit the force applied by the actuator means to the tracks. The actuator may be rotary and the limiter means comprises a torque limiter. The sensor means may be provided for each track. A plurality of the sensors may be provided for each track. The brake means may be provided for each sensor. The brake means may be provided adjacent the or each sensor. Each sensor may be mechanically operable to detect the relative skew. The brake means may be operated mechanically by the sensor in response to the detection of the relative skew. The mechanical operation may comprise a predetermined amount of float. The sensor means may be arranged to operate the brake means via a cantilever. The deployable member may be a control surface for an aircraft wing. The control surface may be a slat.

Another embodiment provides a brake system for an aircraft control surface deployment to track, the brake system comprising:
sensor means operable to detect relative skew of deployment tracks;
braking means operable automatically in response to the detection of the relative skew by the sensor means to brake one or more of the tracks so as to substantially prevent further skew of the deployment tracks.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
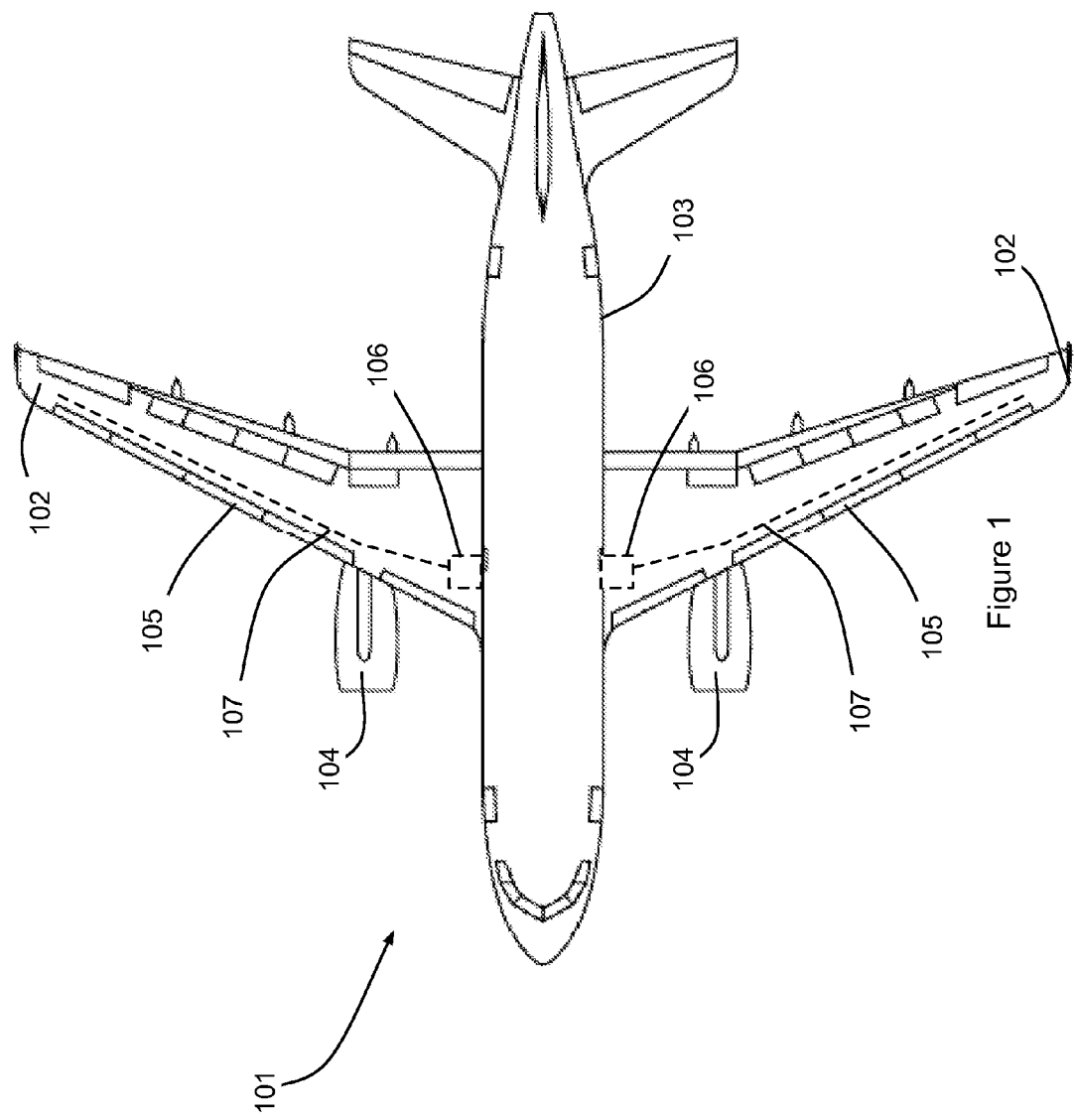
FIG. 1 is a schematic plan view of an aircraft.

With reference to FIG. 1, an aircraft 101 comprises a pair of wings 102 faired into a fuselage 103. Each of the wings carries an engine 104. Each of the wings comprises deployable control surfaces in the form of a set of slats 105. Each set of slats 105 is operated by a drive system 106 connected to the slats 105 by a set of torque shafts 107. In the present embodiment, the drive systems 106 each comprises torque limiters (not shown) arranged to limit output force from the drive system 106 to a predetermined level. In the present embodiment, each drive system 106 is operable to shut down in response to the operation or tripping of the associated torque limiter. Such shut down is signalled to the aircraft systems so as to provide an alert to the aircrew.

Figure 2:
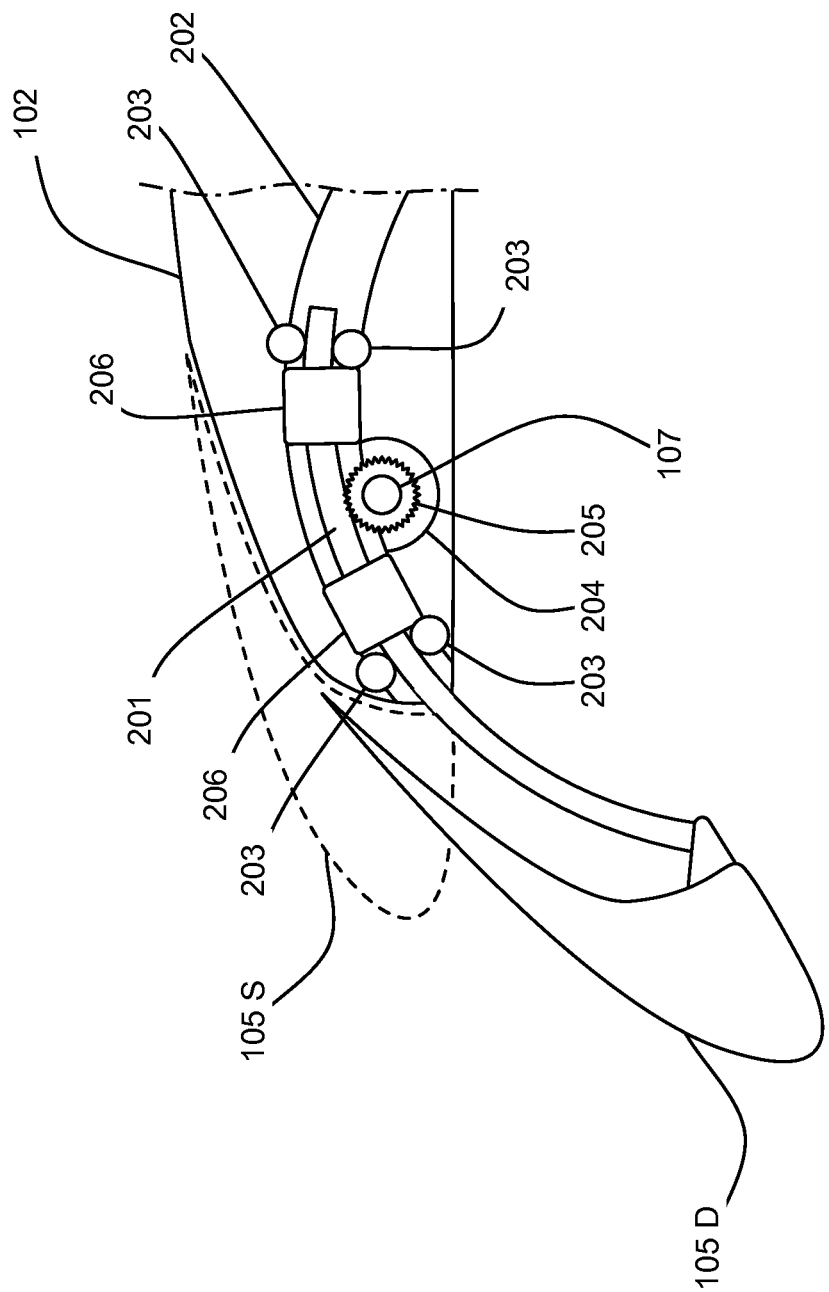
FIG. 2 is a schematic chord-wise cross-sectional view of a slat deployment system in a wing of the aircraft of FIG. 1.

With reference to FIG. 2, the slats 105 are attached to tracks 201 that are each supported by a support member in the form of a housing 202 fixed to the internal structure of the wing 102. The housing 202 supports a set of four rollers 203 on which to the track 201 runs. The tracks 201 enable the slat 105 to be moved from a retracted or stowed position S, indicated in FIG. 2 by a dotted outline, to a fully extended deployed position D as shown in FIG. 2. The torque shaft 107 is coupled with an actuator 204 for each of the tracks 201. In the present embodiment, the actuator 204 comprises a geared rotary actuator that is linked to the track 201 by a rack and pinion 205 mechanism with the rack being providing on the track 201. In the present embodiment, the tracks 201 are further provided with a braking system in the form of four brake means 206.

Figure 3:
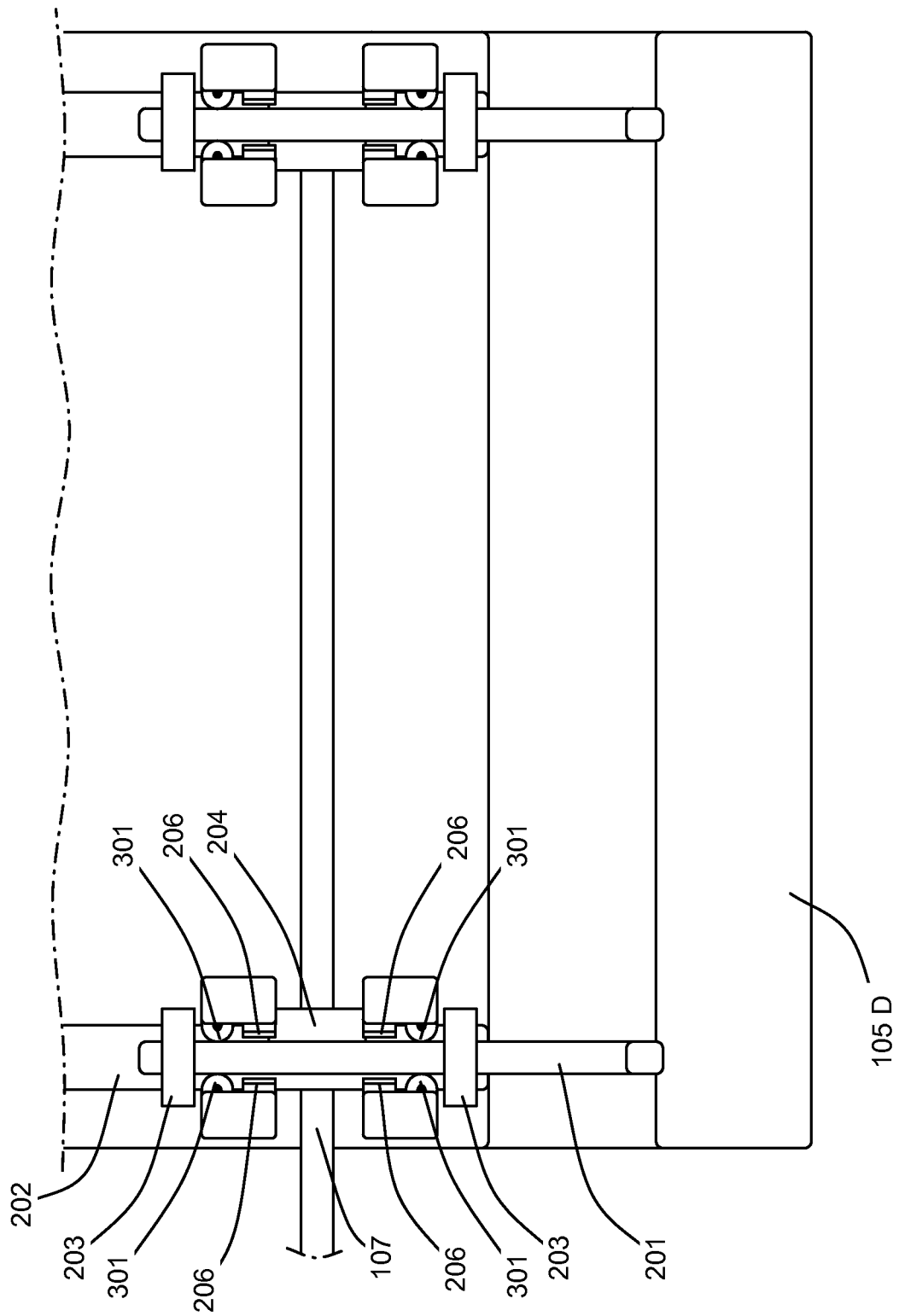
FIG. 3 is a plan view of the slat deployment system of FIG. 2.

With reference to FIG. 3, in the present embodiment, four of the brake means 206 are mounted on the housing 202 on each side of the track 201 adjacent the rollers 203. The actuators 204 are each driven by the torque shaft 107 and arranged to move the two tracks 201 carrying the slat 105 in a parallel simultaneous movement relative to the wing 102 between the stowed position of the slat 105 S and the deployed position of the slat 105 D. The brake means 206 is associated with sensor means 301 arranged to detect relative skew of the tracks 201. In response to detection of such relative skew by the sensor means 301 the brake means 206 is operable to brake the associated track 201 so as to at least substantially prevent further skewing of the tracks 201. In the present embodiment, in response to the braking of the track 201, the torque limiter associated with the drive system 106 for the slat 105 will operate to ensure that the torque applied to the torque shaft 107 is maintained below the predetermined level and in turn to cause the shutdown of the associated drive system 106.

Figure 4:
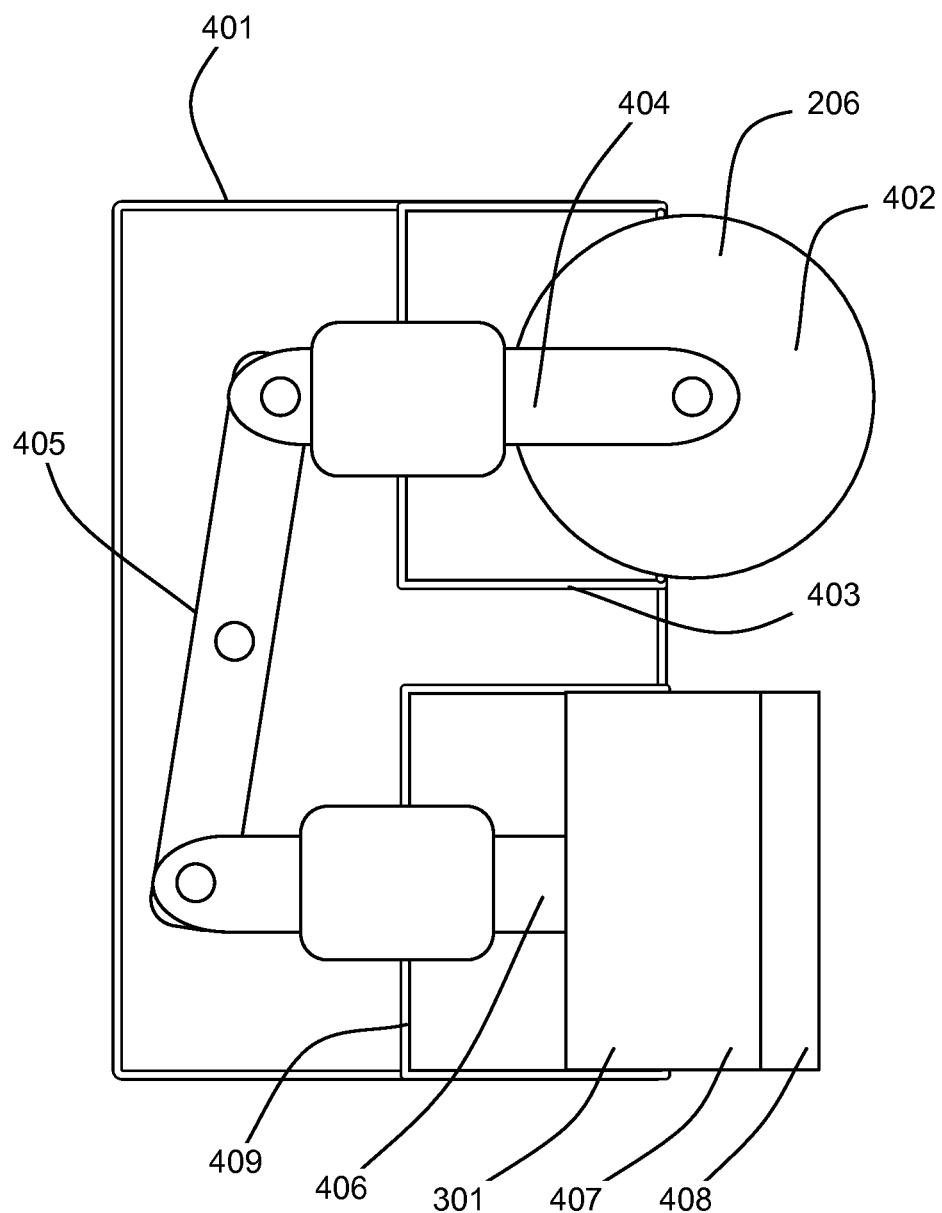
FIG. 4 is a cross-sectional view of a brake system in the slat deployment system of FIG. 2.

With reference to FIG. 4, in the present embodiment, a skew control unit 401 comprises the brake means 206 and the sensor means 301. The sensor means 301 comprises a roller 402 arranged for rolling contact with the side of the track 201. The roller 402 is slidably and rotatably captured within a first open chamber 403 provided in the housing of the skew control unit 401 so as to enable it to roll against the side of the track 201 and to move inwardly and outwardly of the skew control unit 401 within the first open chamber 403. The roller 402 is mounted on a first connecting rod 404 connected to one end of a cantilever 405. The other end of the cantilever 405 is connected to one end of a second connecting rod 406. The brake means 206 is mounted on the other end of the second connecting rod 406. The brake means 206 comprises a brake shoe 407 arranged to carry a brake pad 408. The brake means 206 is slidably captured within a second open chamber 409 provided in the housing of the skew control unit 401 so as to enable it to run against the side of the track 201 and to move inwardly and outwardly of the skew control unit 401 within the chamber 409. The mechanical interconnection of the sensor means 301 and the brake means 206 is thus arranged such that pressure from the track 201 against the roller 402 results in the relative inward movement of the sensor means 301 and the relative outward movement of the brake means 206 so as to apply the brake means 206 to the track 201. Conversely, release of the pressure from the track 201 on the sensor means 301 results in the release of the brake means 206 from the track 201.

Figure 5:
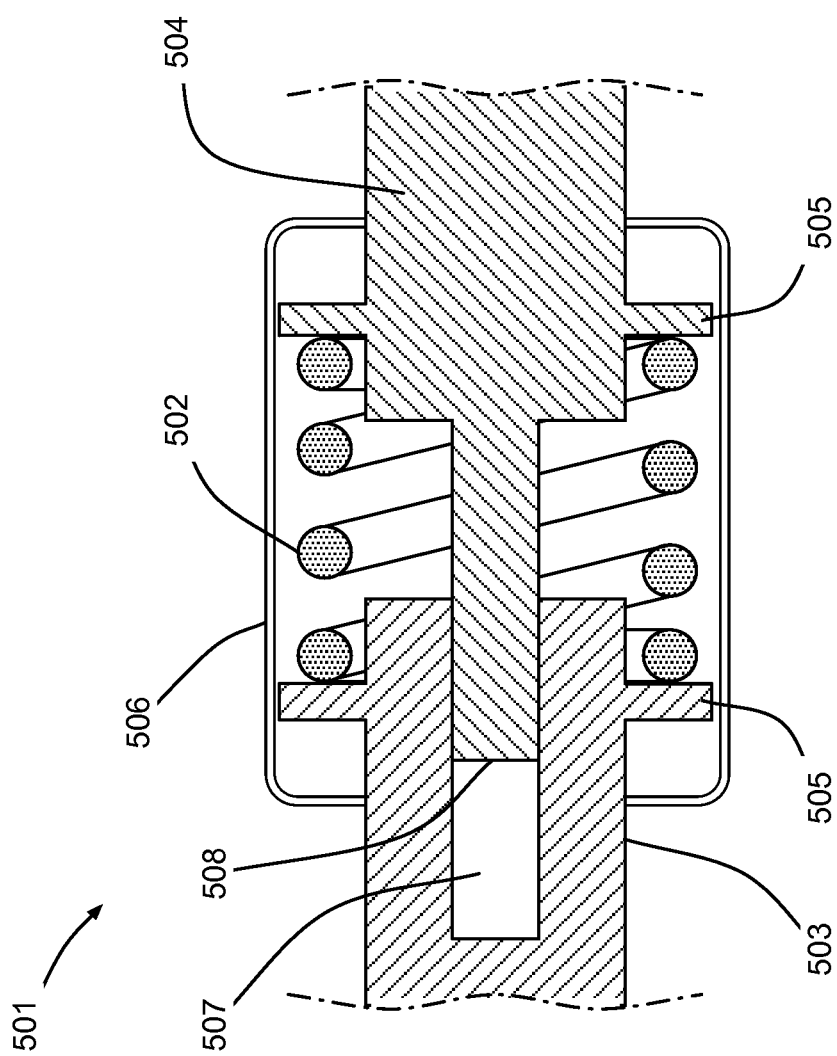
FIG. 5 is a cross-sectional view of float means in the brake system of FIG. 4.

With reference to FIG. 5, in the present embodiment, each of the connecting rods 404, 406 is provided with float means 501 arranged to provide a predetermined level of float in the mechanical connection between the sensor means 301 and the brake means 206. Such float enables the sensor means 301 and the brake means 206 to be positioned so as to maintain low-pressure contact with the side of the relevant track 201 while the two tracks 201 are parallel. In other words, the sensor means 301 and the brake means 206 are maintained in contact against the side of the track 201 without applying significant braking force to the track. Such close contact enables the sensor means 301 and the brake means 206 to react immediately to skewing of the tracks 201. Furthermore, the provided float enables the smoothed application of the brake means 206. In the present embodiment, the float means 501 each comprise a spring 502 interposed between two sub-section 503, 504 of the respective the connecting rod 404, 406. The spring is located on each sub-section 503, 504 by respective flanges 505 and held captive by a collar 506. A first of the connecting rod sub-sections 503 is provided with an axial socket 507 and the second connecting rod sub-section 504 is provided with a complementary axial rod 508. The rod 508 and socket 507 are thus arranged to enable the relative axial sliding of the two connecting rod sub-sections 503, 504 under the biasing force of the spring 502 so as to provide the predetermined amount of biased float in the relevant connecting rod 404, 406. Thus the biasing provided by the spring 502 acts against the compression of the relevant connecting rod 404, 406.

Figure 6:
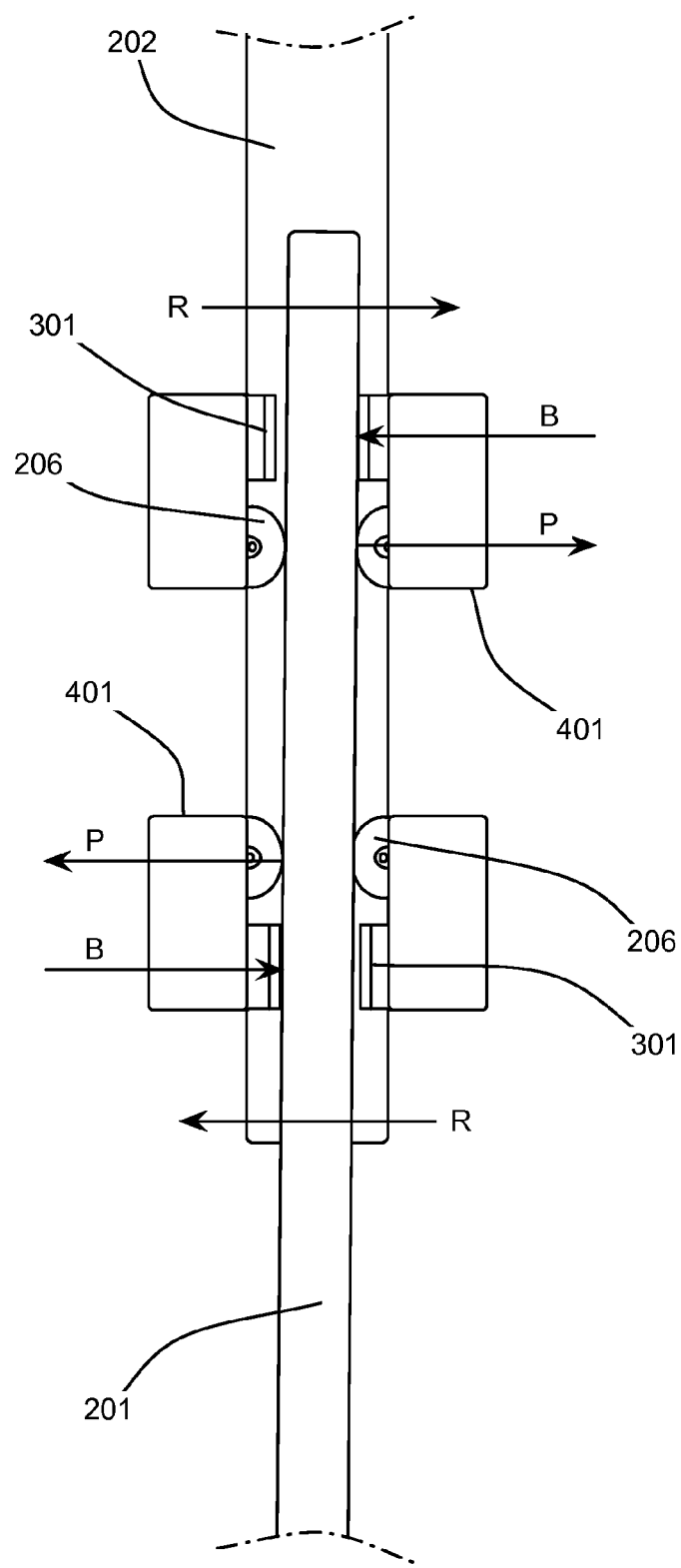
FIG. 6 is a plan view of a skewed track in the slat deployment system of FIG. 2.

With reference to FIG. 6, the skewing of the tracks 201 results in a rotation R of the given track 201 relative to the housing 202. This results in a reactive movement S of each of the sensor means 301 facing the direction of the rotation R. In the example of FIG. 6, the upper right and lower left sensor means 301 detect the skew of the track 201. The movement S of the sensor means 301 results in a corresponding movement B of the corresponding brake means 206. Operation of the brake means 206 brings the respective brake pads 408 into contact with the respective sides of the track 201 so as to brake the track 201 and reduce or substantially prevent further skewing of the tracks 201.

In another embodiment, the float means is provided by an elastomer coupling between respective subsections of the relevant connecting rod. In a further embodiment float means are provided in only one or neither connecting rod or provided in the cantilever.

In another embodiment, the sensor means is provided with a pad arranged to slide along the side surface of the track so as to detect skewing.

In a further embodiment, sensor means and brake means are provided on only one track. In another embodiment, a sensor means and brake means pair are provided on each track of a given deployable member. In a further embodiment, the or each sensor means and brake means pair are provided opposite each other either side of a given track or towards respective ends either side of a given track.

As will be understood by those in the art, the coupling between the sensor means and brake means may be provided by any suitable means such as mechanical, electrical, hydraulic or other means. The brake means may be separately powered from the sensor means. The skew sensor means may be provided by any suitable sensing means such as a non-contact sensor, for example, optical sensors.

In another embodiment, one sensor means is arranged to control the operation of a plurality of brake means. In a further embodiment, one brake means is operable by a to plurality of sensor means. In another embodiment, the sensor means is provided separately from the brake means. In another embodiment, one sensor means on a given track is arranged to control the operation of one or more brake means on other tracks for the deployable member.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A deployment system for deploying a deployable member relative to a base member, said deployment mechanism comprising:
   a base member;
   a deployable member for deployment relative to said base member;
   a plurality of tracks fixed to said deployable member, supported by said base member and operable for parallel simultaneous movement relative to said base member and along a deployment direction;
   an actuator configured to drive said tracks so as to deploy said deployable member;
   a sensor configured to detect a skew of at least one of said tracks, wherein said sensor is positioned adjacent the at least one of said tracks, said sensor includes an element abutting the at least one of said tracks and the element is displaced in a direction transverse to the deployment direction by skewing of the at least one of said tracks; and a brake positioned adjacent the at least one of said tracks and connected to the element of the sensor, wherein the displacement of the element moves the brake to slidably engage the at least one of said tracks in response to detection of said relative skew by said sensor to brake said track so as to suppress the skewing of said tracks.

2. The deployment system according to claim 1 in which said sensor is provided for each said track.

3. The deployment system according to claim 1 wherein a plurality of said sensors are provided for each track.

4. The deployment system according to claim 1 in which said brake is provided for each sensor.

5. The deployment system according to claim 1 in which said brake is provided adjacent each said sensor.

6. The deployment system according to claim 1 in which each said sensor is mechanically operable to detect said relative skew.

7. The deployment system according to claim 1 in which said sensor means is arranged to operate said brake via a cantilever, and the cantilever connects the sensor to the brake.

8. The deployment system according to claim 1 further comprising a limiter associated with said actuator, said limiter arranged to limit the force applied by said actuator to said tracks.

9. The deployment system according to claim 8 in which said actuator is rotary and said limiter comprises a torque limiter.

10. The deployment system according to claim 1 in which said brake is operated mechanically by said sensor in response to said detection of said relative skew.

11. The deployment system according to claim 10 in which said mechanical operation comprises a predetermined amount of float.

12. The deployment system according to claim 1 in which said deployable member is a control surface for an aircraft wing.

13. The deployment system according to claim 12 in which said control surface is a slat.

14. A brake system for an aircraft control surface deployment track, said brake system comprising:
    deployment tracks connecting a first aircraft control surface with a second aircraft control surface, wherein the deployment tracks are configured to extend along a deployment direction to move the second aircraft control surface with respect to the first aircraft control surface;
    a sensor positioned adjacent at least one of said deployment tracks, wherein said sensor includes an element abutting the at least one of said deployment tracks and the element is displaced in a direction transverse to the deployment direction by skewing of the at least one of said deployment; and
    a brake connected to the sensor such that the displacement of the element of the sensor moves the brake automatically to engage and brake one or more of said deployment tracks so as to substantially prevent further skew of said at least one of the deployment tracks.

15. A wing assembly comprising:
    a wing including a leading edge;
    a deployable slat adjacent and parallel to the leading edge;
    a track assembly including tracks attached to the deployable slat and the wing, wherein the tracks are extendable along a longitudinal direction of the track assembly to move the deployable slat between a deployed position and a retracted position;
    a sensor including a displaceable element abutting at least one of the tracks, wherein the displacement element is displaceable in a direction transverse to the longitudinal direction by a skew of the at least one of the tracks, and
    a brake connected to the sensor such that a displacement of the displaceable element moves the brake to engage the at least one of the tracks, wherein the engagement between the at least one of the tracks and the brake slows a rate of extension of the at least one of the tracks as compared to a rate of extension of another one of the tracks.

16. The wing assembly of claim 15 wherein the sensor and brake are connected by a cantilever beam which pivots about a fixed point such that the displacement of the element pivots the cantilever beam and the pivoting of the cantilever beam moves the brake into engagement with the at least one of the tracks.

17. The wing assembly of claim 15 wherein the displaceable element is a roller and the brake includes a brake pad, the wing assembly further comprises a cantilever beam connecting the roller and the brake pad, wherein the cantilever beam pivots about a fixed point between the roller and the brake pad.

* * * * *